June 27, 1933. G. L. B. WAHLSTEN 1,915,562
BLADE RING AND METHOD OF PRODUCING BLADE RINGS
Original Filed June 27, 1929 2 Sheets-Sheet 2
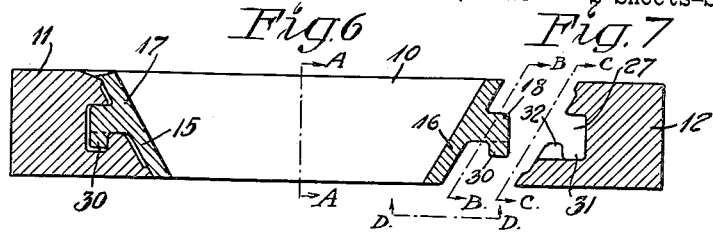
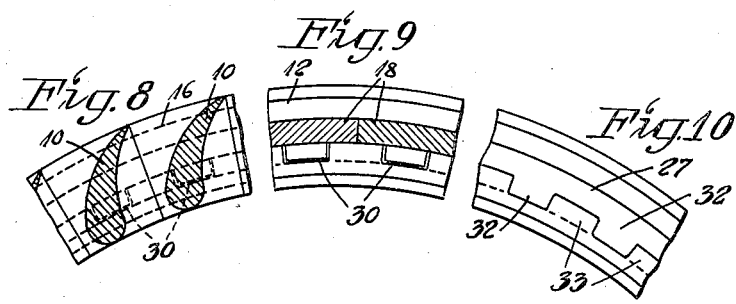
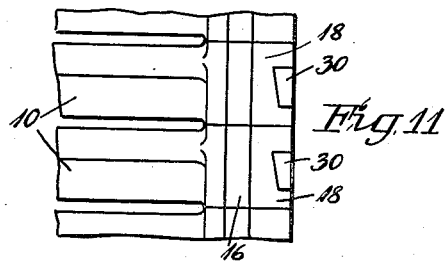
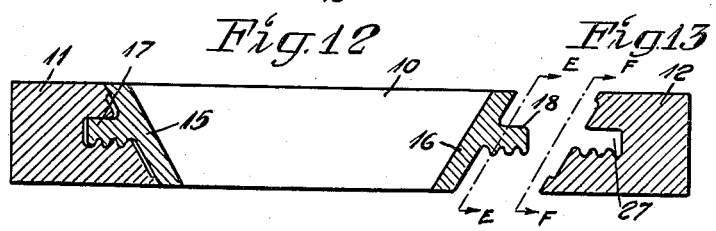
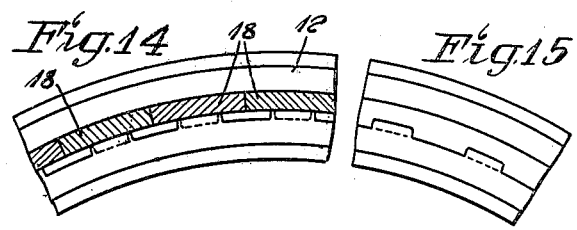
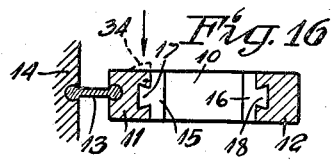
INVENTOR.
Gösta Ludvig Bertil Wahlsten.
BY Cameron, Kerkam & Sutton.
Attorneys.

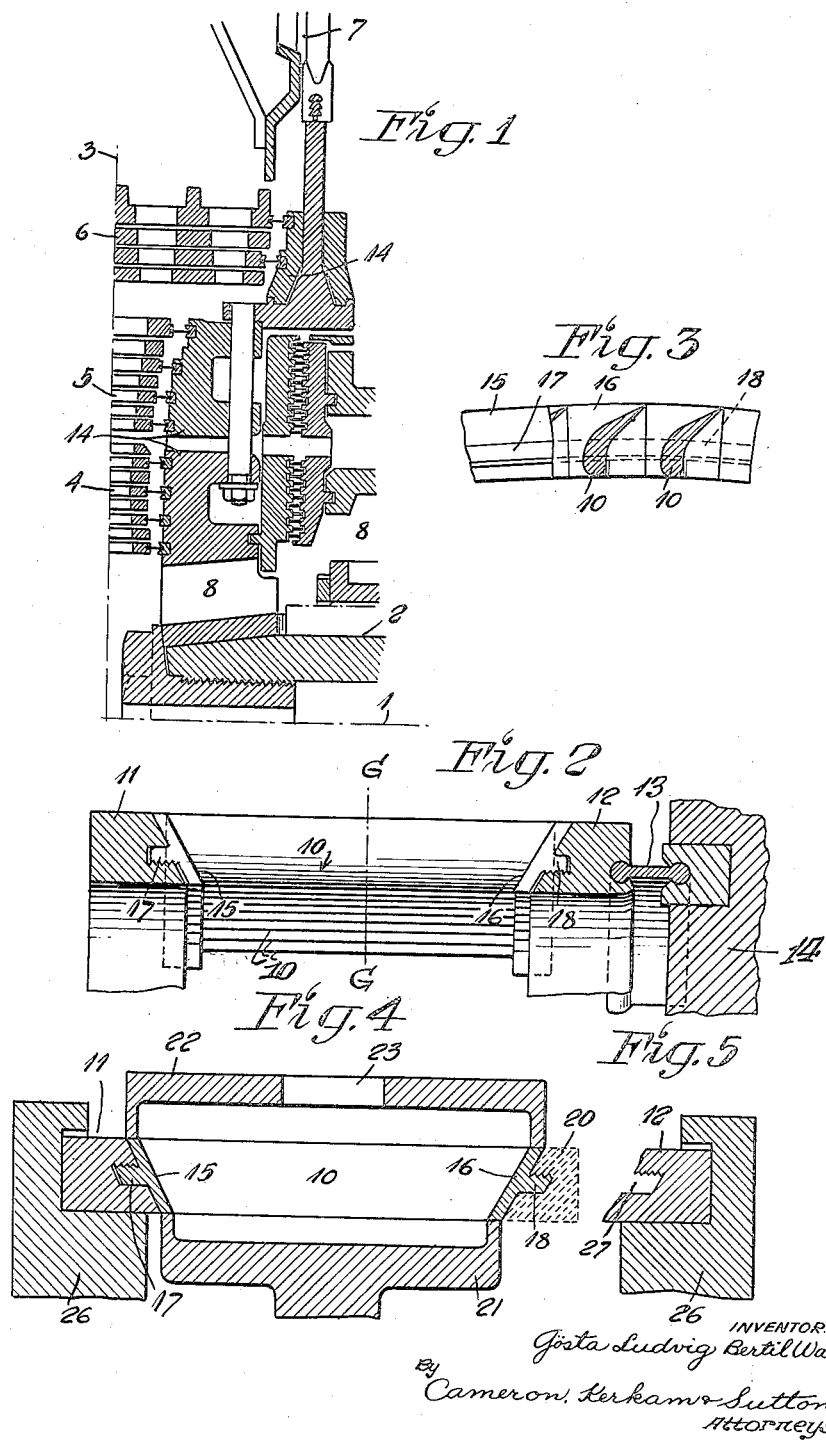

Patented June 27, 1933

1,915,562

UNITED STATES PATENT OFFICE

GÖSTA LUDVIG BERTIL WAHLSTEN, OF STOCKHOLM, SWEDEN, ASSIGNOR TO AKTIEBOLAGET LJUNGSTRÖMS ÅNGTURBIN, OF STOCKHOLM, SWEDEN, A JOINT-STOCK COMPANY

BLADE RING AND METHOD OF PRODUCING BLADE RINGS

Application filed June 27, 1929, Serial No. 374,226, and in Sweden July 3, 1928. Renewed January 29, 1932.

The present invention relates to blade rings for turbines and has particular reference to blade rings for radial flow turbines.

The primary object of the invention is to improve the manufacture of such turbine rings, particularly with respect to the manufacture of the root portions of the turbine blades which are attached to blade carrying elements.

In radial flow elastic fluid turbines, as heretofore constructed, two principal methods of manufacturing the blade rings thereof have been employed. The blade rings of such turbines consist of two or more annular blade carrying elements, hereinafter termed ring bonds, between which are situated the turbine blades, the latter being carried at their ends by the ring bonds. In one of the methods heretofore employed, the turbine blades have been cut from lengths of material having the proper section or profile for the blading and these lengths have then been fitted at their ends into corresponding apertures in thin plate rings, the blade ends being welded to the latter to form a sub-assembly, the rings of which are provided with projections or grooves of dovetail form adapted to be fitted into complementary grooves or projections in the ring bonds. In accordance with the second method heretofore employed, the blades have been separately manufactured, each blade being provided at its ends with blade roots adapted to be connected directly by means of connections of dovetail type, the dovetail connection between the blade roots and the ring bonds being effected by means of a rolling or pressing operation.

The first mentioned method of manufacture has numerous disadvantages among which is the serious disadvantage that the welding operation adversely affects the strength of the materials and causes stresses tending to warp the structure in a manner making it difficult to bring the blade rings to the exact proper form after they have cooled subsequent to the welding operation.

The second mentioned method of manufacture has the serious disadvantage that it is extremely difficult if not impossible to form the roots of the blades separately to precisely the same shape and dimensions and as a result, the connection of the several blades in any one blade ring, to the ring bonds, will not be uniform.

In accordance with the present invention, I overcome the difficulties heretofore encountered in manufacturing blade rings of the type referred to by assembling a plurality of blades of the type having roots at their ends into the form of a drum-like structure, and, with the blades assembled, working the blade roots by suitable operations to a form complementary to the form of portions of the ring bonds to which the blades are to be attached and thereafter connecting the ring bonds to the blade roots.

For a better understanding of the nature of the invention and the manner in which it may be carried into effect, reference may best be had to the following description taken in conjunction with the accompanying drawings which illustrate the manner in which the invention is employed in the manufacture of several different specific forms of blade rings.

In the drawings:—

Fig. 1 shows a cross-section through a part of a radial flow steam turbine having blade rings rotating in opposite directions. Fig. 2 shows a section through a part of an embodiment of such a blade ring on a larger scale. Fig. 3 shows a section on line G—G in Fig. 2 of a part of a blade ring. Figs. 4 and 5 illustrate the method for the production of such a blade ring in accordance with the present invention. Figs. 6 and 7 illustrate another method of production according to the invention. Figs. 8 and 9 show sections on the lines A—A and B—B in Fig. 6. Figs. 10 and 11 show Figs. 7 and 6 seen in the directions of the arrows C—C and D—D respectively. Figs. 12 and 13 illustrate still another embodiment of a method of producing a blade ring according to the invention. Fig. 14 shows a section on the line E—E in Fig. 12. Fig. 15 shows Fig. 13 seen in the direction of the arrows F—F. Fig. 16 illustrates still a further embodiment.

In Fig. 1 the dash-dotted line 1 designates the geometrical axis or axis of rotation of the turbine 2, while the dash-dotted line 3 designates a plane about which the turbine is symmetrical. The turbine as shown consists of four blade systems 4, 5, 6 and 7. The steam, which enters the turbine through the inlet conduit 8, passes the blade systems in named order, between turbine disks 14 carrying the blade systems, and supplies to the turbine energy by means of both pressure and heat losses, every second blade ring in the turbine rotating in a direction opposite to the other.

Figs. 2 and 3 show a portion of such a blade ring having blades 10 which at each end are connected to the ring connections or bonds 11 and 12 by means of projecting rims 17 and 18 arranged at their roots 15 and 16 respectively, which rims are fitted and fixed in complementary slots in the ring bonds in the manner to be described later on in connection with Fig. 4.

The ring bond 12 is connected in known manner to the turbine disk 14 by means of a link connection 13.

The right-hand part of Fig. 4 illustrates a method for producing such a blade ring. The blades 10, which each are made with thickened block-like blade ends or blade roots 20 touching each other, are collected to form a drum (or if desired only a part of such a drum), the axis of the drum being parallel to the length of the blades 10, and are held in this position by means of special auxiliary devices. According to the producing method as shown, the blades 10 are assembled on the circular periphery of an interior fitting or mandrel 21 and are laid close together in such a manner that the blade roots, which serve as distance pieces between the blades, are in peripherally abutting relation. Thereupon an outer fitting mandrel 22 is placed about the periphery of the blades thus assembled, forming a drum, or portion thereof. However, in order that the blades with certainty may keep their places in correct position in relation to each other during the subsequent working operation, an easily fused metal is preferably poured through one or several holes 23 in the outer fitting and solidifies between the blades and the fittings. By this means the blades are kept in that position which they shall have in relation to each other in the finished blade ring.

The ends of the blades 20 are thereupon worked by means of one or more turning operations to form blade roots of such a shape that a strong connection is obtained between the blades and the portions of the ring bonds complementary in shape to the ends of the blade roots. In the embodiment illustrated, this is effected by turning off the portions of the blade roots 20 shown in dotted lines so that each blade root is provided with a peripherally extending projection 18. Since the adjacent blade roots are in abutting relationship, the projections 18 of the several blades together form an annular ringlike projection or rim which, as indicated in the figure, is threaded.

The ring bond 12, which is formed while held in a special fitting or chuck 26 (see Fig. 5), for example by turning or by another method, is provided with a peripheral groove 27 which is provided internally with threads complementary to the threads on the rim 18. The ring bond 12 is then threaded on the rim formed by the projections on the blade roots. The opposite ends of the blades are treated in like manner to provide a rim consisting of the projections 17, this rim being adapted to be screwed into the complementary threaded groove in the ring bond 11. In Fig. 4, the ring bond 11 is shown in its assembled relationship to the blades.

The threading or screwing of the ring bonds on to the blade roots may constitute either the final connection between the parts or may constitute only a preliminary connection. In the latter case any suitable known method may be employed for effecting final fixing or locking of the ring bonds with respect to the blades. After the ring bonds are screwed to the blade roots, the easily fused material employed to hold the blades rigidly in position and also the fittings are removed from the blade ring, leaving the complete blade ring assembly, consisting of the ring bonds having the blades rigidly secured therebetween.

In case the blade ring is of the type employed in the blade system indicated at 6 in Fig. 1, consisting of several ring bonds having blades fixed between them, the method is carried out in identical manner, one of the ring bonds being provided with a second slot 27 opposite to the one shown, in which slot a second blade drum produced in the same manner as described above is threaded. In this case the easily melted material about the first blade drum may be melted away either immediately after the same has been connected with its ring bond, or after the whole blade rim has been completely produced.

According to the method shown in Figs. 6–11, the blades 10 are assembled to form a blade drum in the method described above or in a different way. In this case, however, the projections 17 and 18 of the blade roots are provided with lugs 30 which have less peripheral extent than do the projections, as will be evident from Fig. 9. The slots 27 of the ring bonds 11 and 12 are deepened at 31. In order to be able to introduce the lugs 30 in these slots 31 the edge of groove 27 is provided with slots 32 corresponding to the lugs 30, between which slots ridges 33 are formed which correspond to the spaces between the lugs 30.

By this means the ring bonds can be pushed in the longitudinal direction of the blades 10 into the position shown at the left hand side of Fig. 6, whereupon the ring bond and the blade drum are turned in relation to each other a distance corresponding to the peripheral extent of a lug 30 or ridge 33, so that the lugs 30 will lie behind the ridges 33. It will be evident that the above described construction provides a bayonet type connection between the blade roots and the ring bonds.

In order to insure effective abutting relationship between the parts connected, the lugs 30 and ridges 33 are provided with end faces which are angularly disposed with respect to the axis of rotation of the ring, as will be seen in Fig. 11. In order to secure the parts against loosening due to turning relative to each other, some of the means generally known for this purpose are employed, for example by means of clenching the material at a number of places at the bordering faces.

Upon having connected the blades in the above described manner with the ring bonds, the blades are freed of the auxiliary means which is required for keeping them together during the production of the blade roots as well as for the connection of the blades with the ring bonds.

In Figs. 12–15 there is shown a method of production, which is to be considered as a combination of both preceding methods. The blades 10 are kept together in the manner above described to form a drum. As shown in Figs. 2–5 the projections 17 and 18 and also the slots 27 are provided with threads which, however, in this case are much larger and in addition preferably have greater pitch. In precisely identical manner as shown in Figs. 6–11, recesses are made in the projections 17 and 18 and also in the slots 27, so that in a like manner as shown in Figs. 6–11, at first the projections 17 and 18 are introduced in the slots 27 and in the longitudinal direction of the blades, whereafter an intimate abutting between the blade roots and the ring bond is obtained by turning the pieces relative to each other a distance which approximately corresponds to the widths of the threaded ridges.

By this means the blade roots may be fixed to the ring bonds in the manner described in connection with Fig. 2.

The threads provided in the grooves in the ring bonds and on the blade roots need not be continuous threads but may be of the interrupted type, and instead of threads, an equivalent form of slot or groove may be employed.

In the embodiment as shown in Fig. 16 the blade roots and the ring bond are connected to each other by means of a dove-tail connection, in which the final connection is obtained in the usual manner by pressing down the rims 34 which previously have had the position as shown at the left hand side in the figure by means of dotted lines. In accordance to the invention the blades are however assembled with their end pieces to form a drum and in this position the blade ends are formed to form blade roots and are given their final form and are connected to the ring bonds.

Many other variations in the method of producing ring connections according to the principle of the invention may be conceived and in the statements above only a few examples have been described, by means of which the blade roots may be produced collectively in a simplified manner, and in which the blades are joined to the ring bonds by keeping the blades in proper relation to each other in the positions they have had during the production of the blade roots. By producing a blade ring in this manner, the costs of manufacture may be considerably reduced without the necessity of employing auxiliary operations such as welding or the like which have a detrimental and weakening action upon the material. The blades may be produced with relatively little wastage, because the blade roots are manufactured from the beginning in a predetermined position which corresponds to the position they are to have in the finally completed blade ring structure.

In the several variations of the method hereinabove described, the blade roots have been described as being of a form such that blade roots of adjacent blades abut against each other, the blade roots of a set of blades, when in assembled position, forming a complete annular ring. However, the blades may be made in a form such that the blade roots have less peripheral extent, for example, only so much peripheral extent as may be required to provide the proper strength. In this case, distance pieces may be arranged between the blade roots, such distance pieces preferably, but not necessarily having projections similar to the projections on the blade roots and adapted to engage the blade rings.

What I claim as new and desire to secure by Letters Patent of the United States of America is:

1. The method of manufacturing blade rings comprising two or more ring bonds and blades provided with blade roots situated between the ring bonds, which consists in assembling said blades to form a drum, working the roots of the blades to a form complementary to the form of the portions of the ring bonds to which the blades are to be connected and connecting the blade roots with the ring bonds.

2. The method of manufacturing blade rings comprising two or more ring bonds and blades provided with blade roots situated between the ring bonds which consists in assembling the blades to form a drum, working the blade roots to a desired shape permitting attachment of the ring bonds to the blades by relative turning movement thereof with respect to the blades, and effecting a preliminary attachment of the ring bonds to the blade roots by turning the ring bonds relative to the blade roots.

3. The method of manufacturing blade rings comprising two or more ring bonds and blades provided with blade roots situated between the ring bonds which consists in assembling the blades to form a drum, working the blade roots to a desired shape permitting attachment of the ring bonds to the blades by relative turning movement thereof with respect to the blades, effecting a preliminary attachment of the ring bonds to the blade roots by turning the ring bonds relative to the blade roots, and subsequently effecting the final locking between the blade roots and the ring bonds.

4. The method of manufacturing blade rings comprising two or more ring bonds and blades provided with blade roots situated between the ring bonds which consists in assembling the blades to form a drum, working said blade roots in said ring bonds to form cooperating rims or ridges thereon and effecting connection between said cooperating rims or ridges to secure the parts together.

5. The method of manufacturing blade rings comprising two or more ring bonds and blades provided with blade roots situated between the ring bonds which consists in assembling the blades to form a drum, working said blade roots and said ring bonds to form interrupted cooperating projections thereon, inserting the projections on the blade roots between the projections on the ring bonds and turning the blade roots and the ring bonds relative to each other to bring the projections of the one part behind the projections of the other part.

6. The method of manufacturing blade rings comprising two or more ring bonds and blades provided with blade roots situated between the ring bonds which consists in assembling the blades to form a drum, providing said blade roots and said ring bonds with coinciding ridges and grooves and connecting said blade roots with said ring bonds by causing said grooves to catch said ridges.

7. The method of manufacturing blade rings comprising two or more ring bonds and blades provided with blade roots situated between the ring bonds which consists in assembling the blades to form a drum, providing said blade roots and said ring bonds with coinciding dove-tail-shaped ridges and grooves and connecting said blade roots with said ring bonds by causing said grooves to catch said ridges.

8. The method of manufacturing blade rings comprising two or more ring bonds and blades provided with blade roots situated between the ring bonds which consists in assembling the blades to form a drum, providing said blade roots and said ring bonds with coinciding dovetail-shaped ridges and grooves and effecting the connection between said blade roots and said ring bonds by attaching the ring bonds and by causing deformation of one of the parts.

9. The method of manufacturing a blade ring of the type having spaced ring bonds and blades provided with blade roots situated between the ring bonds which consists in providing the ring bonds with attaching surfaces, assembling and holding a group of blades in the same position relative to each other which they are to occupy in the completed blade ring, working the blade roots while holding the blades in assembled position to form attaching surfaces adapted to cooperate with the attaching surfaces on the ring bonds and securing the blades to the ring bonds by bringing the attaching surfaces into cooperative attaching relation.

10. The method of manufacturing a blade ring of the type having spaced ring bonds and blades provided with blade roots situated between the ring bonds which consists in providing the ring bonds with undercut attaching surfaces, assembling and holding a group of blades in the same position relative to each other which they are to occupy in the completed blade ring, working the blade roots while holding the blades in assembled position to form complementary undercut surfaces adapted to cooperate with the first mentioned surfaces and securing the blades to the ring bonds by bringing said undercut surfaces into cooperative attaching relation.

11. The method of manufacturing a blade ring of the type having spaced ring bonds and blades provided with blade roots situated between the ring bonds which consists in providing the ring bonds with attaching surfaces comprising screw threads, assembling and holding a group of blades in the same position relative to each other which they are to occupy in the completed blade ring, working the blade roots while holding the blades in assembled position to provide attaching surfaces comprising complementary screw threads and securing the blades to the ring bonds by screwing the threaded surfaces together.

12. In the manufacture of blades for radial flow turbines and of the type having enlarged blade roots at their ends, that improvement which consists in assembling and holding the blades in desired position to form a drum-like structure having annular rings at its ends comprising the blade roots, and working the ends of the blade roots to provide attaching surfaces thereon adapted to cooperate with complementary surfaces on blade carrying members common to all of said blades.

13. In the manufacture of blades for radial flow turbines and of the type having enlarged blade roots at their ends, that improvement which consists in assembling and holding the blades in desired position to form a drum-like structure having annular rings at its ends comprising the blade roots, and working the ends of the blade roots to provide surfaces forming a part of a bayonet type joint and adapted to engage complementary surfaces on blade carrying members common to all of said blades.

14. In the manufacture of blades for radial flow turbines and of the type having enlarged blade roots at their ends, that improvement which consists in assembling and holding the blades in desired position to form a drum-like structure having annular rings at its ends comprising the blade roots, and working the ends of the blade roots to provide threads thereon adapted to be screwed into engagement with complementary threads on blade carrying members common to all of said blades.

15. In the manufacture of blades for radial flow turbines and of the type having enlarged blade roots at their ends, that improvement which consists in assembling and holding the blades in desired position to form a drum-like structure having annular rings at its ends comprising the blade roots, and working the ends of the blade roots to provide undercut surfaces adapted to engage complementary surfaces on blade carrying members common to all of the blades.

16. A blade ring for radial flow turbines comprising axially spaced annular ring bonds and blades between said ring bonds, said ring bonds and said blades having cooperating grooves and projections whereby to secure the blade roots to the ring bonds upon turning movement of the blades relative to the ring bonds.

17. A blade ring for radial flow turbines comprising axially spaced annular ring bonds and a plurality of blades between the ring bonds, said blades having roots at their ends and said roots and said ring bonds having cooperating threads for securing the blade roots to the ring bonds.

18. A blade ring for radial flow turbines comprising axially spaced annular ring bonds and a plurality of blades between the ring bonds, said blade roots having peripherally extending threaded projections and said ring bonds having peripherally extending threaded grooves providing a screw connection between the blade roots and the ring bonds.

19. A blade ring for radial flow turbines comprising axially spaced annular ring bonds and a plurality of blades between the ring bonds, said blades having roots at their ends and said roots and said ring bonds having cooperating surfaces providing a bayonet type connection between the ring bonds and the blade roots.

In testimony whereof I affix my signature.

GÖSTA LUDVIG BERTIL WAHLSTEN.